(12) United States Patent
Vanderwerf (10) Patent No.: US 8,019,539 B2
(45) Date of Patent: *Sep. 13, 2011

(54) NAVIGATION SYSTEM WITH APPARATUS FOR DETECTING ACCURACY FAILURES

(75) Inventor: Kevin Vanderwerf, Oro Valley, AZ (US)

(73) Assignee: Honeywell International Inc., Morristown, NJ (US)

( * ) Notice: Subject to any disclaimer, the term of this patent is extended or adjusted under 35 U.S.C. 154(b) by 478 days.

This patent is subject to a terminal disclaimer.

(21) Appl. No.: 12/102,527

(22) Filed: Apr. 14, 2008

(65) Prior Publication Data

US 2009/0146873 A1  Jun. 11, 2009

Related U.S. Application Data (60) Provisional application No. 61/012,303, filed on Dec. 7, 2007.

(51) Int. Cl.
*G01C 21/00* (2006.01)

(52) U.S. Cl. .................. 701/213; 701/215; 342/357.51

(58) Field of Classification Search .......... 701/213–215; 342/357, 357.58, 357.59, 357.65
See application file for complete search history.

(56) References Cited

U.S. PATENT DOCUMENTS

| | | | |
|---|---|---|---|
| 4,235,758 A | 11/1980 | Dawson | |
| 4,235,759 A | 11/1980 | Ohbu | |
| 5,760,737 A * | 6/1998 | Brenner | 342/357.58 |
| 5,786,773 A | 7/1998 | Murphy | |
| 5,808,581 A * | 9/1998 | Braisted et al. | 342/357.58 |
| 5,831,576 A | 11/1998 | Sheynblat | |
| 5,931,889 A | 8/1999 | Misra | |
| 6,134,484 A | 10/2000 | Geier et al. | |
| 6,169,957 B1 | 1/2001 | Arethens | |
| 6,204,806 B1 | 3/2001 | Hoech | |
| 6,205,377 B1 | 3/2001 | Lupash | |
| 6,239,740 B1 | 5/2001 | Collins | |
| 6,281,836 B1 | 8/2001 | Lupash | |
| 6,317,688 B1 | 11/2001 | Bruckner | |
| 6,407,701 B2 | 6/2002 | Ito | |
| 6,577,952 B2 * | 6/2003 | Geier et al. | 701/214 |
| 6,639,549 B2 * | 10/2003 | Vanderwerf et al. | 342/357.58 |

(Continued)

FOREIGN PATENT DOCUMENTS

CA  2379702  10/2003

OTHER PUBLICATIONS

European Patent Office, "European Search Report", Apr. 26, 2010, Published in: EP.

(Continued)

*Primary Examiner* — Thomas Black
*Assistant Examiner* — Marthe Marc Coleman
(74) *Attorney, Agent, or Firm* — Fogg & Powers LLC (57) ABSTRACT

A navigation system for a vehicle having a receiver operable to receive a plurality of signals from a plurality of transmitters includes a processor and a memory device. The memory device has stored thereon machine-readable instructions that, when executed by the processor, enable the processor to determine a set of error estimates corresponding to pseudorange measurements derived from the plurality of signals, determine an error covariance matrix for a main navigation solution using ionospheric-delay data, and, using a parity space technique, determine at least one protection level value based on the error covariance matrix.

19 Claims, 4 Drawing Sheets

U.S. PATENT DOCUMENTS

| | | |
|---|---|---|
| 6,691,066 B1 | 2/2004 | Brodie |
| 6,711,478 B2 | 3/2004 | Hilb |
| 6,757,579 B1 * | 6/2004 | Pasadyn ................. 700/108 |
| 6,760,663 B2 | 7/2004 | Brenner |
| 6,769,663 B2 * | 8/2004 | Kelly et al. ................. 249/91 |
| 6,781,542 B2 * | 8/2004 | Hoven et al. ............. 342/357.59 |
| 6,798,377 B1 | 9/2004 | Lupash et al. |
| 6,847,893 B1 * | 1/2005 | Lupash ................. 701/213 |
| 6,860,023 B2 | 3/2005 | Manfred |
| 6,861,979 B1 | 3/2005 | Zhodzishsky |
| 7,095,369 B1 | 8/2006 | Clark |
| 7,219,013 B1 * | 5/2007 | Young et al. ................. 701/214 |
| 7,356,445 B2 | 4/2008 | Brodie |
| 7,409,289 B2 | 8/2008 | Coatantiec |
| 7,783,425 B1 * | 8/2010 | Hwang et al. ................. 701/214 |
| 7,860,651 B2 | 12/2010 | Morgan |
| 2001/0020214 A1 | 9/2001 | Brenner |
| 2002/0116098 A1 | 8/2002 | Maynard |
| 2002/0120400 A1 | 8/2002 | Lin |
| 2003/0117317 A1 | 6/2003 | Vanderwerf |
| 2004/0123474 A1 | 7/2004 | Manfred et al. |
| 2004/0210389 A1 | 10/2004 | Zimmerman |
| 2004/0220733 A1 | 11/2004 | Pasturel et al. |
| 2005/0001762 A1 | 1/2005 | Han et al. |
| 2005/0093739 A1 | 5/2005 | DiLellio |
| 2006/0047413 A1 | 3/2006 | Lopez et al. |
| 2006/0158372 A1 | 7/2006 | Heine et al. |
| 2007/0156338 A1 | 7/2007 | Coatantiec |
| 2008/0015814 A1 | 1/2008 | Harvey, Jr. |
| 2008/0204316 A1 | 8/2008 | Brodie |
| 2009/0079636 A1 | 3/2009 | Riley |
| 2009/0150074 A1 | 6/2009 | Vanderwerf |
| 2009/0171583 A1 | 7/2009 | DiEsposti |
| 2009/0182493 A1 | 7/2009 | McDonald et al. |
| 2009/0182494 A1 | 7/2009 | McDonald et al. |
| 2009/0182495 A1 | 7/2009 | McDonald et al. |

OTHER PUBLICATIONS

Vanderwerf, "FDE Using Multiple Integrated GPS/Inertial Kalman Filters in the Presence of Temporally and Spatially Correlated Ionospheric Errors", "Proceedings of the Institute of Navigation (ION) GPS", Sep. 11, 2001, pp. 2676-2685.

European Patent Office, "Office Action", Dec. 10, 2010, Published in: EP.

Brown, Grover R., "A Baseline GPS RAIM Scheme and a Note on the Equivalence of Three RAIM Methods", "Journal of the Institute of Navigation", 1992, pp. 301-316, vol. 39, No. 3, Publisher: Navigation.

* cited by examiner

NAVIGATION SYSTEM WITH APPARATUS FOR DETECTING ACCURACY FAILURES

CROSS REFERENCE TO RELATED APPLICATION

This application claims priority from U.S. Provisional Appl. No. 61/012,303 entitled "RAIM WITH SPATIALLY CORRELATED IONOSPHERIC ERRORS" filed Dec. 7, 2007, which is incorporated by reference as if fully set forth herein.

BACKGROUND OF THE INVENTION

Conventional RAIM algorithms may be based on either a weighted or un-weighted least squares solution where the errors in each satellite's pseudo-range measurement are uncorrelated with the errors in the other satellites' pseudo-range measurements.

However, the ionospheric error (which can be the dominant error source) in each satellite's pseudo-range is, in fact, highly correlated with that of each of the other satellites. By ignoring this correlation, the computed Horizontal Protection Limit (HPL) which bounds the horizontal position error is much larger than necessary. As a result the availability of GPS to do a low Required Navigation Performance (RNP) approach suffers.

SUMMARY OF THE INVENTION

In an embodiment of the invention, a navigation system for a vehicle having a receiver operable to receive a plurality of signals from a plurality of transmitters includes a processor and a memory device. The memory device has stored thereon machine-readable instructions that, when executed by the processor, enable the processor to determine a set of error estimates corresponding to pseudo-range measurements derived from the plurality of signals, determine an error covariance matrix for a main navigation solution using ionospheric-delay data, and, using a parity space technique, determine at least one protection level value based on the error covariance matrix.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
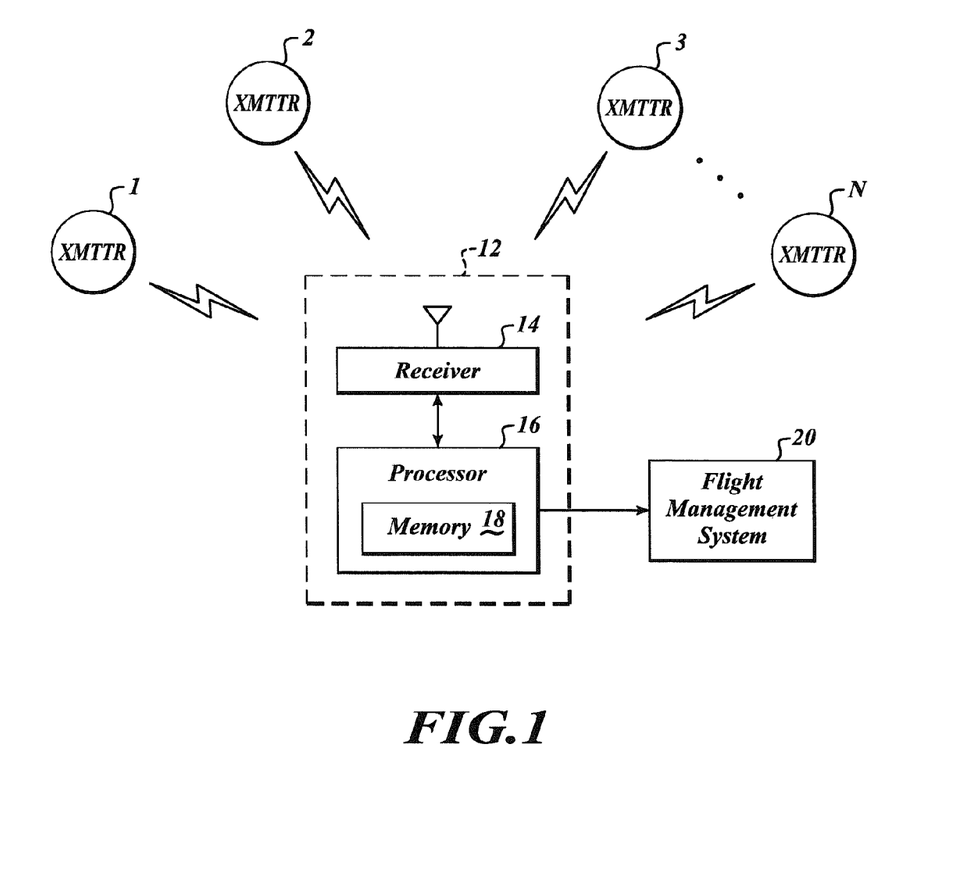
FIG. 1 shows a navigation system incorporating embodiments of the present invention.

FIG. 1 shows a radio navigation system incorporating the teachings of an embodiment of the present invention. The system includes several transmitters 1-N and user set 12. Transmitters 1-N, in the preferred embodiment, are a subset of the NAVSTAR GPS constellation of satellite transmitters, with each transmitter visible from the antenna of user set 12. Transmitters 1-N broadcast N respective signals indicating respective transmitter positions and signal transmission times to user set 12.

User set 12, mounted to an aircraft (not shown), includes receiver 14, processor 16, and a memory device, such as processor memory 18. Receiver 14, preferably NAVSTAR GPS compatible, receives the signals, extracts the position and time data, and provides pseudorange measurements to processor 16. From the pseudorange measurements, processor 16 derives a position solution for the user set 12. Although the satellites transmit their positions in World Geodetic System of 1984 (WGS-84) coordinates, a Cartesian earth-centered earth-fixed system, the preferred embodiment determines the position solution in a local reference frame L, which is level with the north-east coordinate plane and tangential to the Earth. This frame choice, however, is not critical, since it is well-understood how to transform coordinates from one frame to another.

Processor 16 also uses the pseudorange measurements to detect satellite transmitter failures and to determine a worst-case error, or protection limit, both of which it outputs with the position solution to flight management system 20. Flight management system 20 compares the protection limit to an alarm limit corresponding to a particular aircraft flight phase. For example, during a pre-landing flight phase, such as non-precision approach, the alarm limit (or allowable radial error) is 0.3 nautical miles, but during a less-demanding oceanic flight phase, the alarm limit is 2-10 nautical miles. (For more details on these limits, see RTCA publication DO-208, which is incorporated herein by reference.) If the protection limit exceeds the alarm limit, the flight management system, or its equivalent, announces or signals an integrity failure to a navigational display in the cockpit of the aircraft. The processor also signals whether it has detected any satellite transmitter failures.

An embodiment of the invention models the correlation of the ionospheric errors between each pair of satellites as a function of the distance between their ionospheric pierce points. The closer the pierce points, the higher the correlation. The root-mean-square (RMS) uncertainty (or sigma) of each satellite's pseudo-range measurement is computed using the ionospheric variance model defined in DO-229D, Appendix J. Using the computed correlation coefficients and the sigma for each satellite, the ionospheric measurement error covariance matrix is formed. The remaining errors (satellite clock and ephemeris, tropospheric, multi-path and receiver noise) are assumed to be uncorrelated. Thus, the combined measurement error covariance matrix for these error sources is diagonal. These two matrices are added to form the total measurement error covariance matrix. This matrix is then inverted to form the weighting matrix for the least squares solution. Fault detection and exclusion can then be performed and the various protection levels such as the horizontal protection level (HPL), vertical protection level (VPL), horizontal exclusion level (HEL), and vertical exclusion level (VEL) computed based on the methods of solution separation previously described in U.S. Pat. Nos. 5,760,737 and 6,639,549, each of which are incorporated by reference as if fully set forth herein.

Figure 2:
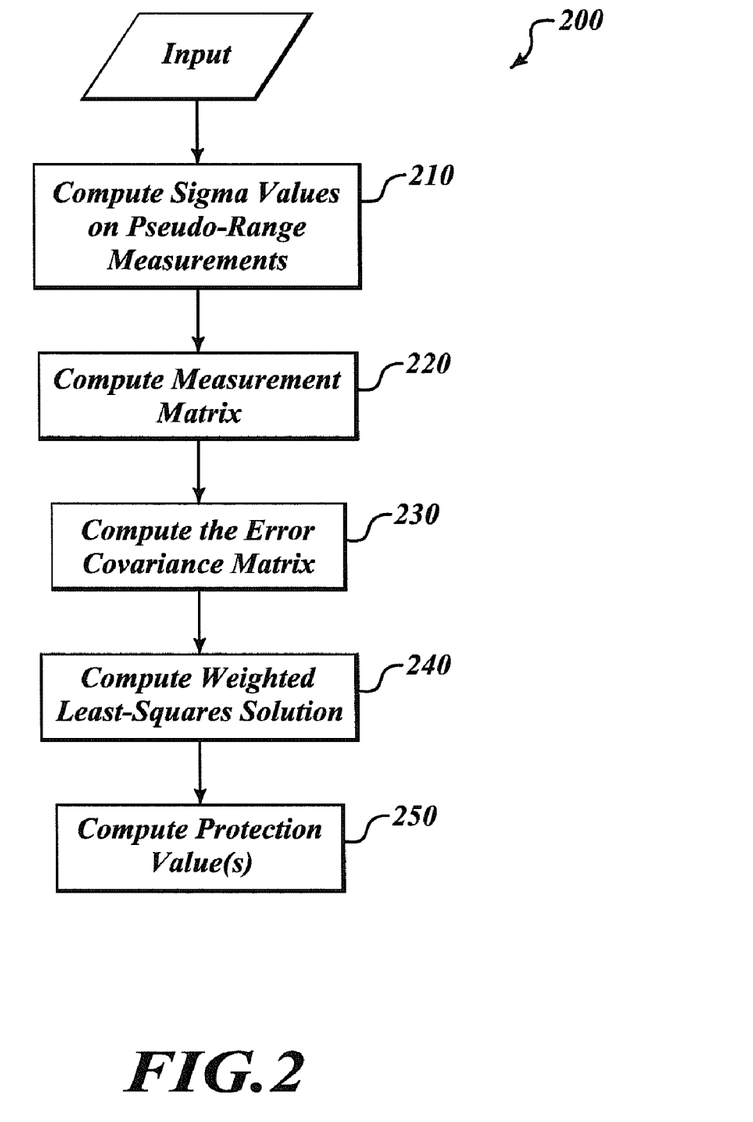
FIG. 2 shows a process according to an embodiment of the invention.

FIG. 2 illustrates a process 200, according to an embodiment of the invention, that can be implemented in the radio navigation system illustrated in FIG. 1. The process 200 is illustrated as a set of operations or steps shown as discrete blocks. The process 200 may be implemented in any suitable hardware, software, firmware, or combination thereof. As such the process 200 may be implemented in computer-executable instructions that can be transferred from one electronic device to a second electronic device via a communications medium. The order in which the operations are described is not to be necessarily construed as a limitation.

Referring to FIG. 2, at a step 210, the processor 16 computes the sigma (error) values on pseudo-range and measurements.

At a step 220, the processor 16 determines the measurement matrix. The true vector of pseudo-range residuals $\Delta \rho$ is related to the incremental position/time solution vector $\Delta x$ (distance from the position linearization point) as follows:

$$\Delta \rho = \rho - \hat{\rho} = H \Delta x \qquad (1)$$

where H is the measurement matrix and is given by:

$$H = \begin{bmatrix} -LOS_{1x} & -LOS_{1y} & -LOS_{1z} & 1 \\ -LOS_{2x} & -LOS_{2y} & -LOS_{2z} & 1 \\ \vdots & \vdots & \vdots & \vdots \\ -LOS_{Nx} & -LOS_{Ny} & -LOS_{Nz} & 1 \end{bmatrix}$$

$$\begin{bmatrix} LOS_{ix} \\ LOS_{iy} \\ LOS_{iz} \end{bmatrix} = \begin{array}{l} \text{Line-of-sight unit vector pointing} \\ \text{from the user to satellite } i \end{array}$$

$\Delta x = x - \hat{x} =$ true position/clock bias- linearization point

At a step 230, the processor 16 computes the Error Covariance Matrix. The vector of measured pseudo-range residuals $\Delta \tilde{\rho}$ is the true pseudo-range residual vector plus the vector of residual errors $\delta \rho$ and is thus:

$$\Delta \tilde{\rho} = \rho + \delta \rho - \hat{\rho} \qquad (2)$$
$$= \tilde{\rho} - \hat{\rho}$$
$$= H \Delta x + \delta \rho$$

The processor 16 designates the post-update estimate of $\Delta x$ as $\Delta \hat{x}$. Then, the processor 16 can define the vector of post-update measurement residuals as:

$$\xi = \Delta \tilde{\rho} - H \Delta \hat{x} \qquad (3)$$

Each post-update measurement residual is the difference between the measured pseudo-range residual and the predicted pseudo-range residual based on the post-update estimate $\Delta \hat{x}$.

A "weighted least-squares solution" can be determined by the processor 16 by finding the value of $\Delta \hat{x}$ which minimizes the weighted sum of squared residuals. Thus, the processor 16 may minimize:

$$\xi^T W \xi = (\Delta \tilde{\rho} - H \Delta \hat{x})^T W (\Delta \tilde{\rho} - H \Delta \hat{x}) \qquad (4)$$

where W is an appropriate weighting matrix. The weighting matrix generally chosen is one which normalizes the residuals based on the uncertainty of each pseudo-range measurement. Thus, the processor 16 yields:

$$W = \begin{bmatrix} 1/\sigma_1^2 & 0 & \ldots & 0 \\ 0 & 1/\sigma_2^2 & \ldots & 0 \\ \vdots & \vdots & \ddots & \vdots \\ 0 & 0 & \ldots & 1/\sigma_N^2 \end{bmatrix}, \begin{array}{l} \text{assuming uncorrelated} \\ \text{measurements} \end{array} \qquad (5)$$

which represents the inverse of the pseudo-range measurement error covariance matrix assuming each pseudo-range error is uncorrelated with the others.

However, the vertical ionospheric delay component of each pseudo-range error is highly correlated with the others. If this correlation is known, then the processor 16 can take advantage of that knowledge by using the true pseudo-range measurement error covariance matrix R. The weighting matrix then becomes $$W = R^{-1} = \begin{bmatrix} \sigma_1^2 & E[\delta\rho_1\delta\rho_2] & \ldots & E[\delta\rho_1\delta\rho_N] \\ E[\delta\rho_1\delta\rho_2] & \sigma_2^2 & \ldots & E[\delta\rho_2\delta\rho_N] \\ \vdots & \vdots & \ddots & \vdots \\ E[\delta\rho_1\delta\rho_N] & E[\delta\rho_2\delta\rho_N] & \ldots & \sigma_N^2 \end{bmatrix}^{-1} \qquad (6)$$

The value of $\Delta \hat{x}$ that minimizes (4) is determined by taking the derivative, setting it equal to zero, and solving for $\Delta \hat{x}$. This yields:

$$\Delta \hat{x} = (H^T W H)^{-1} H^T W \Delta \tilde{\rho} \qquad (7)$$
$$= S \Delta \tilde{\rho}$$

where the processor 16 has defined the weighted least-squares solution matrix S as:

$$S = (H^T W H)^{-1} H^T W \qquad (8)$$

Altitude Aiding

Barometric altitude can be used by the processor 16 to augment the GPS pseudo-range measurements. If it is used, the measurement matrix is then augmented as follows $$H = \begin{bmatrix} -LOS_{1x} & -LOS_{1y} & -LOS_{1z} & 1 \\ -LOS_{2x} & -LOS_{2y} & -LOS_{2z} & 1 \\ \vdots & \vdots & \vdots & \vdots \\ -LOS_{Nx} & -LOS_{Ny} & -LOS_{Nz} & 1 \\ 0 & 0 & -1 & 0 \end{bmatrix} \qquad (9)$$

This measurement matrix assumes that the incremental position vector (the first 3 elements) within $\Delta x$ are given in local-level coordinates (with the z axis down). The line-of-sight (LOS) elements then must also be expressed in the local-level coordinates. The weighting matrix is also augmented as follows $$W = R^{-1} = \begin{bmatrix} \sigma_1^2 & E[\delta\rho_1\delta\rho_2] & \cdots & E[\delta\rho_1\delta\rho_N] & 0 \\ E[\delta\rho_1\delta\rho_2] & \sigma_2^2 & \cdots & E[\delta\rho_2\delta\rho_N] & 0 \\ \vdots & \vdots & \ddots & \vdots & \vdots \\ E[\delta\rho_1\delta\rho_N] & E[\delta\rho_2\delta\rho_N] & \cdots & \sigma_N^2 & 0 \\ 0 & 0 & \cdots & 0 & \sigma_{baro}^2 \end{bmatrix}^{-1} \quad (10)$$

Computing the Measurement Covariance Matrix

There are multiple methods that can be employed to determine the measurement error covariance matrix. In the case of a Kalman filter application, the temporal behavior (time-correlation) of the ionospheric delays may be modeled. The spatially correlated ionospheric error for satellite i can be modeled as a weighted sum of three independent normalized (sigma=1.0) Gaussian random errors scaled by the nominal iono sigma value for that satellite as follows:

$$\delta\rho_{iono\_i} = \sigma_{iono\_i} k_{iono\_i}^T x_{ref} \quad (11)$$

where $x_{ref}$ is a 3×1 vector of independent Gaussian random errors with zero mean and a variance of 1. The weighting vector $k_{iono\_i}^T$ is determined by the processor 16 by first defining three grid points on the thin shell model of the ionosphere (at a height of 350 km) equally spaced in azimuth at a great circle distance of 1500 km from the user. The processor 16 may then define a 3×1 vector $x_{grid}$ of normalized delays at these points. The delays at gridpoints i and j may be spatially correlated with each other based on the great circle distances between them according to:

$$E[x_{grid\_i} x_{grid\_j}^T] = 1 - (1 - e^{-d}\text{grid/diono})^2 \quad (12)$$

where $d_{grid\_i,grid\_j}$ = great circle distance between grid point i and grid point j $d_{iono}$ = correlation distance of the ionospheric delay = 4000 km $\quad (13)$ Using that relationship the processor 16 can form a 3×3 covariance matrix $P_{grid}$ which describes the correlations between each of the grid points:

$$P_{grid} = E[x_{grid} x_{grid}^T]$$

If the delay processes that exist at these grid points are a certain linear combination of the reference independent Gaussian random errors, then they will have the desired spatial and temporal correlation. The processor 16 may assume that the desired linear combination is obtained by using a 3×3 upper-triangular mapping matrix $U_{grid}$ as follows:

$$x_{grid} = U_{grid} x_{ref} \quad (14)$$

The grid covariance matrix is then:

$$P_{grid} = E[x_{grid} x_{grid}^T] = U_{grid} E[x_{ref} x_{ref}^T] U_{grid}^T \quad (15)$$
$$= U_{grid} U_{grid}^T$$

Therefore, the mapping matrix $U_{grid}$ can be formed by the processor 16 simply by factoring the covariance matrix $P_{grid}$. Since the geometry of the three gridpoints is fixed, the covariance matrix $P_{grid}$ is constant and can thus be pre-computed by the processor 16. Now the processor 16 can choose a linear combination of the three grid-point delays that yields a normalized delay at the pierce-point of the satellite i such that the proper spatial correlation with the three grid points (and thus, presumably, each of the other satellites) is achieved as follows:

$$\delta\rho_{norm\_iono\_i} = k_{sat\_i\_grid}^T x_{grid} \quad (16)$$

where $k_{sat\_i\_grid}$ = 3-vector of weighting factors $\delta\rho_{norm\_iono\_i}$ = normalized delay at the satellite pierce-point The satellite pseudo-range delay may be correlated to the delay at the $k^{th}$ grid point according to:

$$E[\delta\rho_{norm\_iono\_i} x_{grid\_k}] = 1 - (1 e^{-d_{sat-i,grid-k}/d_{iono}})^2 \quad (17)$$

where $d_{sat\_i,grid\_k}$ = great circle distance between the satellite pierce point and the grid point $d_{iono}$ = correlation distance of the nominal ionospheric delay $\quad (18)$ The 1×3 covariance matrix $P_{sat\_i\_grid}$, which defines the correlations between satellite i and each of the grid points, is $$P_{sat\_i\_grid} = E[\delta\rho_{norm\_i} x_{grid}^T] = E[K_{sat\_i\_grid}^T x_{grid} x_{grid}^T] \quad (19)$$
$$= K_{sat\_i\_grid}^T P_{grid}$$

Therefore the weighting vector $k_{sat\_grid}$ can be found by the processor 16 as follows:

$$k_{sat\_i\_grid}^T = P_{sat\_i\_grid} P_{grid}^{-1} \quad (20)$$

Combining (14) and (16), the processor 16 can obtain the normalized vertical delays directly from the three independent reference delays as follows:

$$\delta\rho_{norm\_iono\_i} = K_{sat\_i\_grid}^T U_{grid} x_{ref} \quad (21)$$
$$= K_{iono\_i}^T x_{ref}$$

Thus, the weighting vector is:

$$k_{iono\_i}^T = k_{sat\_i\_grid} U_{grid} \quad (22)$$

The processor 16 can form a vector of N normalized pseudo-range iono delays from (21) as follows:

$$\delta\rho_{norm\_iono\_i} = \begin{bmatrix} K_{sat\_1\_grid}^T \\ K_{sat\_2\_grid}^T \\ \vdots \\ K_{sat\_N\_grid}^T \end{bmatrix} U_{grid} x_{ref} \quad (23)$$
$$= K_{sat\_grid} U_{grid} x_{ref}$$

The actual (non-normalized) delay along the line of sight can be obtained by the processor 16 by scaling the normalized delay by the sigma value for that satellite based on the geomagnetic latitude of the pierce-point and obliquity factor as defined in DO-229. In vector form, the processor 16 yields:

$$\delta\rho_{iono} = \begin{bmatrix} \sigma_{iono\_1} & 0 & \cdots & 0 \\ 0 & \sigma_{iono\_2} & \ddots & \vdots \\ \vdots & \ddots & \ddots & 0 \\ 0 & \cdots & 0 & \sigma_{iono\_N} \end{bmatrix} \delta\rho_{norm\_iono} \quad (24)$$

$$= \begin{bmatrix} \sigma_{iono\_1} & 0 & \cdots & 0 \\ 0 & \sigma_{iono\_2} & \ddots & \vdots \\ \vdots & \ddots & \ddots & 0 \\ 0 & \cdots & 0 & \sigma_{iono\_N} \end{bmatrix} K_{sat\_grid} U_{grid} x_{ref}$$

$$= \Gamma K_{sat\_grid} U_{grid} x_{ref}$$

The ionospheric delay error covariance matrix may be defined as:

$$R_{iono} = E[\delta\rho_{iono}\delta\rho_{iono}^T] \quad (25)$$

$$= \Gamma K_{sat\_grid} U_{grid} E[x_{ref} x_{ref}^T] U_{grid}^T K_{sat\_grid}^T \Gamma^T$$

$$= \Gamma K_{sat\_grid} P_{grid} K_{sat\_grid}^T \Gamma^T$$

$$R_{iono} = \begin{bmatrix} \sigma_{iono\_1}^2 & E[\delta\rho_{iono\_1}\delta\rho_{iono\_2}] & \cdots & E[\delta\rho_{iono\_1}\delta\rho_{iono\_N}] \\ E[\delta\rho_{iono\_1}\delta\rho_{iono\_2}] & \sigma_{iono\_2}^2 & \cdots & E[\delta\rho_{iono\_2}\delta\rho_{iono\_N}] \\ \vdots & \vdots & \ddots & \vdots \\ E[\delta\rho_{iono\_1}\delta\rho_{iono\_N}] & E[\delta\rho_{iono\_2}\delta\rho_{iono\_N}] & \cdots & \sigma_{iono\_N}^2 \end{bmatrix}$$

The rest of the pseudo-range measurement errors are assumed to be uncorrelated with a composite one-sigma value denoted by $\sigma_{other\_i}$ for satellite i. For simplicity, the processor 16 can assume that the one-sigma value for each satellite is a constant six meters. The total measurement error covariance matrix is then:

$$R = W^{-1} = R_{iono} + \begin{bmatrix} \sigma_{other\_1}^2 & 0 & \cdots & 0 \\ 0 & \sigma_{other\_2}^2 & \ddots & \vdots \\ \vdots & \ddots & \ddots & 0 \\ 0 & \cdots & 0 & \sigma_{other\_N}^2 \end{bmatrix} \quad (26)$$

In a snapshot RAIM approach, the correlations between satellites are computed directly without the use of a grid. Computing the correlations between satellites directly may be both simpler and slightly more accurate.

Specifically, ionospheric error covariance may be modeled as a function of the great circle distance between the pierce points along the ionospheric shell (350 km above the earth's surface):

$$E[\delta\rho_{iono\_i}\delta\rho_{iono\_j}] = \sigma_{iono\_i}\sigma_{iono\_j}[1-(1-e^{-d_{ij}/d_{iono}})^2]$$

where:

$d_{ij}$ = great circle distance between pierce points for sats i and j $d_{iono}$ = de-correlation distance = 4000 km Ionospheric errors are highly correlated. As such:

$$W = R^{-1} = (R_{iono} + R_{other})^{-1}$$

where:

$$R_{iono} = \begin{bmatrix} \sigma_{iono\_1}^2 & E[\delta\rho_{iono\_1}\delta\rho_{iono\_2}] & \cdots & E[\delta\rho_{iono\_1}\delta\rho_{iono\_N}] \\ E[\delta\rho_{iono\_1}\delta\rho_{iono\_2}] & \sigma_{iono\_2}^2 & \cdots & E[\delta\rho_{iono\_2}\delta\rho_{iono\_N}] \\ \vdots & \vdots & \ddots & \vdots \\ E[\delta\rho_{iono\_1}\delta\rho_{iono\_N}] & E[\delta\rho_{iono\_2}\delta\rho_{iono\_N}] & \cdots & \sigma_{iono\_N}^2 \end{bmatrix}$$

$$R_{other} = \begin{bmatrix} \sigma_{other\_1}^2 & 0 & \cdots & 0 \\ 0 & \sigma_{other\_2}^2 & \cdots & 0 \\ \vdots & \vdots & \ddots & \vdots \\ 0 & 0 & \cdots & \sigma_{other\_N}^2 \end{bmatrix}$$

Error Covariance for the Weighted Least Squares Solution

At a step 240, the processor 16 computes a weighted least-squares solution. The error in the post-updated solution is:

$$\delta\hat{x} = \Delta\hat{x} - \Delta x \quad (27)$$

$$= (H^T W H)^{-1} H^T W \Delta\tilde{\rho} - \Delta x$$

Substituting (2) into (27) yields:

$$\delta\hat{x} = (H^T W H)^{-1} H^T W (H\Delta x + \delta\rho) - \Delta x \quad (28)$$

$$= \Delta x - (H^T W H)^{-1} H^T W \delta\rho - \Delta x$$

$$= (H^T W H)^{-1} H^T W \delta\rho$$

$$= S\delta\rho$$

Thus, the solution matrix S maps the pseudo-range errors into the post-updated solution error vector. The solution error covariance matrix may be defined as:

$$P = E[\delta\hat{x}\delta\hat{x}^T] = SE[\delta\rho\delta\rho^T]S^T \quad (29)$$

$$= SW^{-1}S^T$$

$$= (H^T W H)^{-1} H^T W W^{-1} W H (H^T W H)^{-1}$$

$$= (H^T W H)^{-1}$$

The x and y horizontal position errors are statistically described by the upper 2×2 portion of P. The major and minor axes of the horizontal position error ellipse are equal to the square roots of the maximum and minimum eigenvalues of this 2×2 matrix and represent the one-sigma errors in the corresponding directions. Thus, the one-sigma error in the worst-case direction is given by:

$$\sigma_{horz\_max} = \sqrt{\lambda_{max}^{P(1:2,1:2)}} \quad (30)$$

$$= \sqrt{\frac{p_{11}+p_{22}}{2} + \sqrt{\left(\frac{p_{11}-p_{22}}{2}\right)^2 + (p_{12})^2}}$$

The one-sigma error in the vertical position is given by:

$$\sigma_{vert}\sqrt{p_{33}} \quad (31)$$

Horizontal Figure of Merit is a conservative 95% fault-free error bound and may be computed by the processor 16 as the 2D RMS error from the error covariance matrix $$HFOM = 2\sqrt{P(1,1)+P(2,2)}$$

Similarly, the Vertical Figure of Merit may be computed by the processor 16 as the 2-sigma vertical error from the error covariance matrix $$VFOM = 2\sqrt{P(3,3)}$$

Parity Space RAIM

At a step 250, the processor 16 computes at least one protection level value. In doing so, the processor 16 can employ a parity space technique. Recall that the weighted least squares solution may be expressed as:

$$\Delta \hat{x} = (H^T W H)^{-1} H^T W \Delta \tilde{\rho}$$
$$= S \Delta \tilde{\rho}$$
$$W = R^{-1} = (E[\delta \rho \delta \rho^T])^{-1}$$

The correlated measurement set can be transformed by the processor 16 into a set that is uncorrelated by factoring, using a matrix factorization method known in the art, the weighting matrix W:

$$W = L^T L$$

Where L is the lower triangular square root of W. This results in:

$$\Delta \hat{x} = (H^T L^T L H)^{-1} H^T L^T L \Delta \tilde{\rho} = [(LH)^T LH]^{-1} (LH)^T L \Delta \tilde{\rho}$$
$$= (\overline{H}^T \overline{H})^{-1} \overline{H}^T \Delta \overline{\rho} = \overline{S} \Delta \overline{\rho}$$

where $\overline{H} = LH$, $\Delta \overline{\rho} = L \Delta \tilde{\rho}$, $\overline{S} = (\overline{H}^T \overline{H})^{-1} \overline{H}$ The covariance of the transformed measurement errors is:

$$E[\delta \overline{\rho} \delta \overline{\rho}^T] = E[L \delta \rho \delta \rho^T L^T]$$
$$= L W^{-1} L^T = L(L^T L)^{-1} L^T$$
$$= L(L^{-1} L^{-T}) L^T$$
$$= I_N$$

Thus, it is seen that the transformed measurements are uncorrelated, each with unity variance. Multiplying our measurement equation by L the processor 16 gets:

$$L \Delta \tilde{\rho} = LH \Delta x + L \delta \rho$$

$$\Delta \overline{\rho} = \overline{H} \Delta x + \delta \overline{\rho}$$

An N×N orthogonal matrix Q can be found by the processor 16, such that:

$$Q\overline{H} = \begin{bmatrix} q_{11} & q_{12} & \cdots & q_{1N} \\ q_{21} & q_{22} & \cdots & q_{2N} \\ q_{31} & q_{32} & \cdots & q_{3N} \\ q_{41} & q_{42} & \cdots & q_{4N} \\ q_{51} & q_{52} & \cdots & q_{5N} \\ \vdots & \vdots & \vdots & \vdots \\ q_{N1} & q_{N2} & q_{N3} & q_{NN} \end{bmatrix} \overline{H} = \begin{bmatrix} A \\ B \end{bmatrix} \overline{H} = \begin{bmatrix} u_{11} & u_{12} & u_{13} & u_{14} \\ 0 & u_{22} & u_{23} & u_{24} \\ 0 & 0 & u_{33} & u_{34} \\ 0 & 0 & 0 & u_{44} \\ 0 & 0 & 0 & 0 \\ \vdots & \vdots & \vdots & \vdots \\ 0 & 0 & 0 & 0 \end{bmatrix} = \begin{bmatrix} U \\ 0 \end{bmatrix}$$

Thus, if the processor 16 multiplies the measurement equation by Q, the result is:

$$Q\Delta \overline{\rho} = Q\overline{H}\Delta x + Q\delta \overline{\rho}$$
$$\begin{bmatrix} A \\ B \end{bmatrix} \Delta \overline{\rho} = \begin{bmatrix} U \\ 0 \end{bmatrix} \Delta x + \begin{bmatrix} A \\ B \end{bmatrix} \delta \overline{\rho}$$

Where A is the upper 4×N portion of Q and B is the lower (N−4)×N portion. The following two equations result:

$$A\Delta\overline{\rho} = U\Delta x + A\delta\overline{\rho}$$

$$B\Delta\overline{\rho} = B\delta\overline{\rho} = p$$

The first equation can be used to solve for the estimated least squares solution by setting the pseudo-range error to zero:

$$A\Delta\overline{\rho} = U\Delta\hat{x} \Rightarrow \Delta\hat{x} = U^{-1} A\Delta\overline{\rho}$$

This equation is a more efficient than the previously given one since it only requires inverting an upper-triangular matrix.

The second equation gives us the parity vector p which is non-zero only when there are pseudo-range errors. In the absence of a failure, the parity covariance is:

$$E[pp^T] = BE[\delta\overline{\rho}\delta\overline{\rho}^T]B^T = BB^T$$
$$= I_{N-4}$$

Thus the parity elements are also uncorrelated zero mean Gaussian random variables with unity variance.

In an embodiment, the processor 16 employs a chi-square method using the concept of pbias. In such an embodiment, the processor 16 uses the square of the parity magnitude as the discriminator (test statistic) d as follows:

$$d = p^T p = p_1^2 + p_2^2 + \ldots + p_{N-4}^2$$

The discriminator will then have a central chi-square distribution with N−4 degrees of freedom. The processor 16 places a threshold on this discriminator above which a failure is declared. This threshold D is computed by the processor 16 from the chi-square probability density function to yield an allowable false alarm probability.

Once the threshold has been set, the question becomes, with a failure on a single satellite that results in the discriminator just reaching the threshold, how large the resulting position error can be while meeting the probability of missed detection. A bias failure $\epsilon$ on the kth satellite will result in a solution error and a parity magnitude error of:

$$\delta \hat{x} = S \delta \rho = S \begin{bmatrix} 0 \\ \vdots \\ \varepsilon \\ \vdots \\ 0 \end{bmatrix} = \begin{bmatrix} s_{1k} \\ s_{2k} \\ s_{3k} \\ s_{4k} \end{bmatrix} \varepsilon$$

$$|p| = \sqrt{p^T p}$$
$$= \sqrt{\delta \rho^T L^T B^T B L \delta \rho}$$
$$= \varepsilon \sqrt{\Lambda_{kk}}$$

where $\Lambda = \overline{B}^T \overline{B}$ and $\overline{B} = BL$

Thus the parity bias is related to the horizontal position error through the following slope:

$$\text{slope}(k) = \frac{\sqrt{s_{1k}^2 + s_{2k}^2}}{\sqrt{\Lambda_{kk}}}$$

Figure 3:
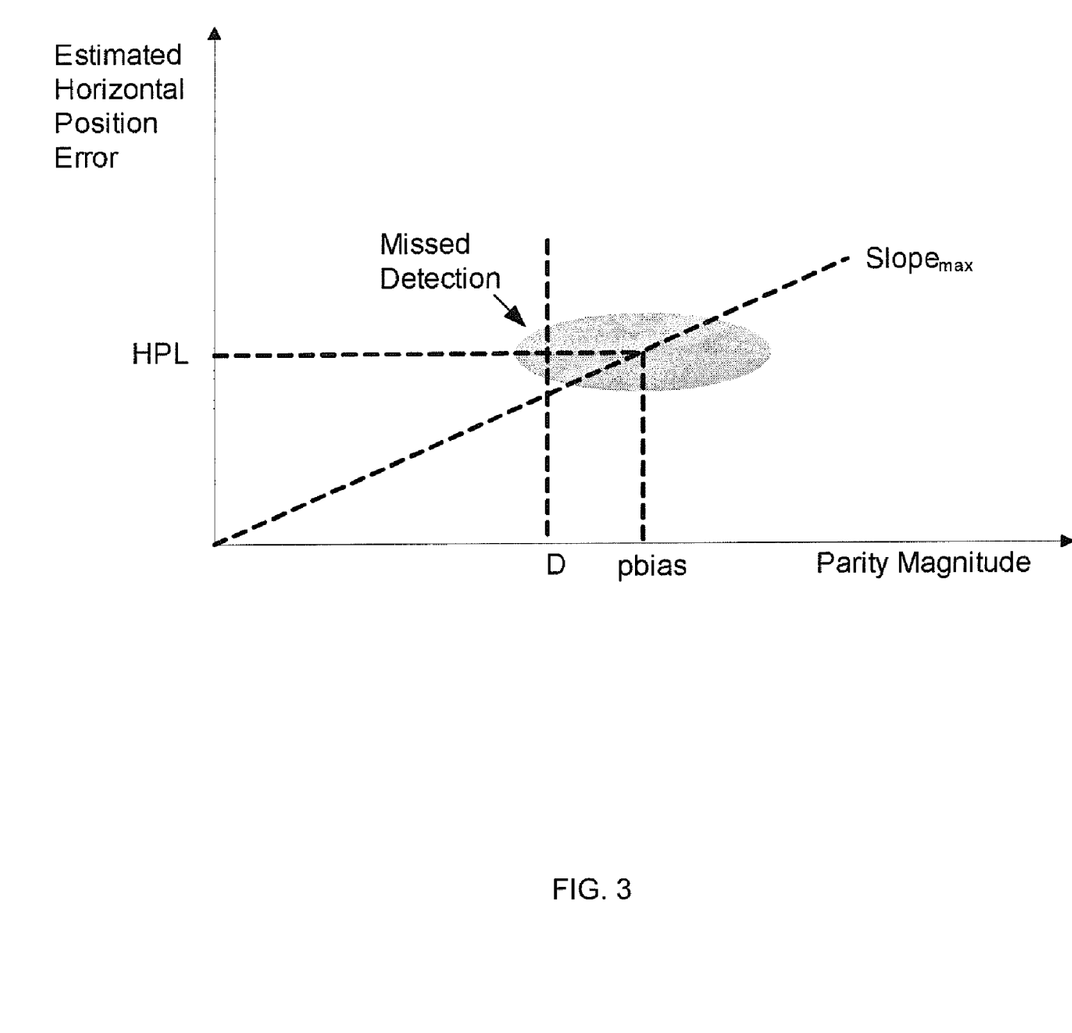
FIG. 3 depicts a noise scatter that would occur if there was a bias on the most difficult to detect satellite in the presence of the expected noise.

The satellite with the largest slope is the most difficult to detect. This slope is referred to as Slope$_{max}$. FIG. 3 depicts a noise scatter that would occur if there was a bias on the most difficult to detect satellite in the presence of the expected noise. The specific bias that results in the percentage of data to the left of the detection threshold D equal to the missed detection probability is of particular interest. The parity magnitude associated with this bias is called "pbias."

With the bias present, the discriminator (square of the parity magnitude) has a non-central chi-square distribution with N−4 degrees of freedom. It can be shown that the non-centrality parameter λ of the chi-square distribution is:

$$\lambda = \text{pbias}^2$$

Thus, using the non-central chi-square probability density function, the processor 16 can determine the value for pbias which meets the required probability of missed detection.

The Horizontal Protection Level (HPL) is then:

$$\text{HPL} = \text{Slope}_{max} \cdot \text{pbias}$$

Gaussian Method by Rotation of the Parity Space

Figure 4:
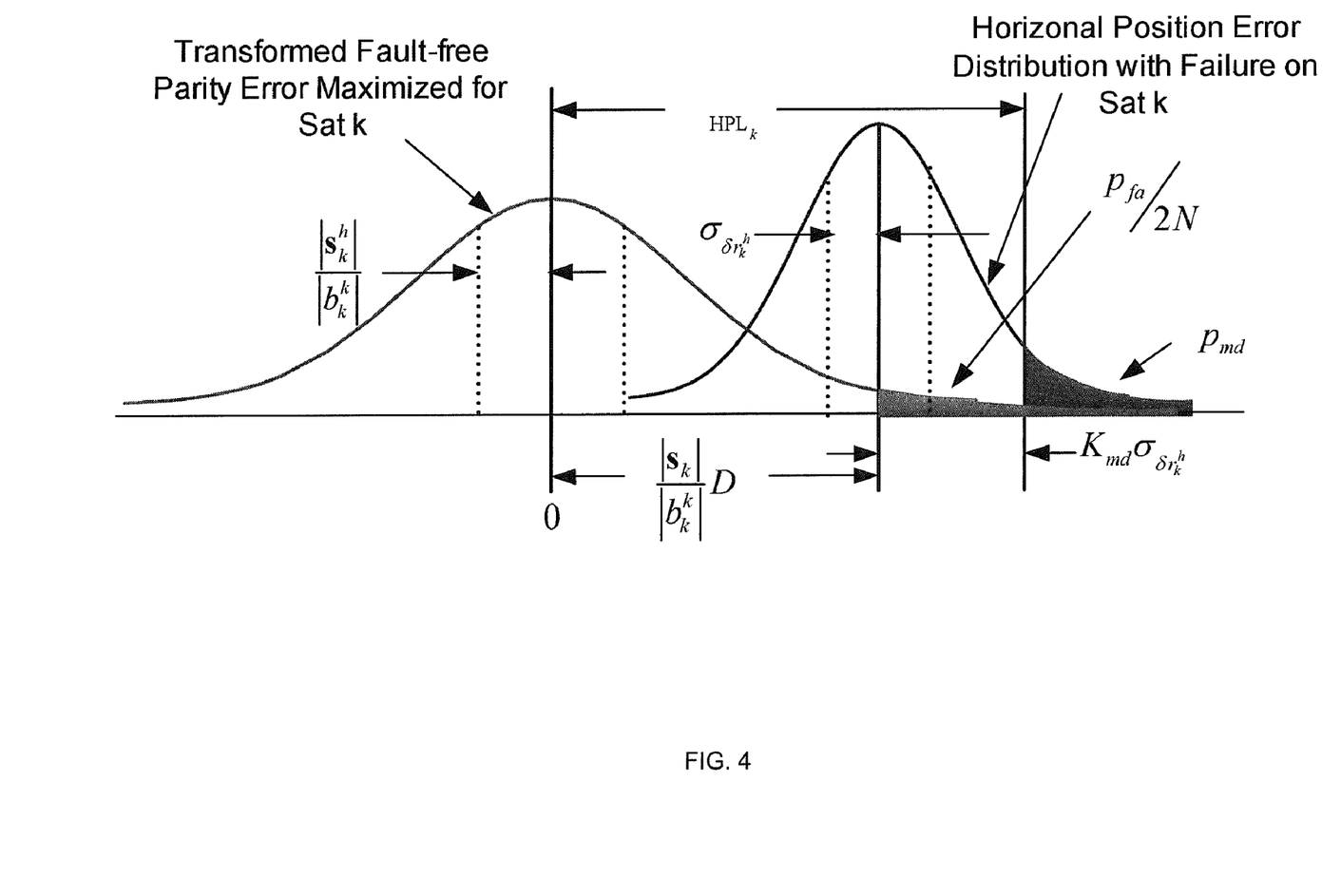
FIG. 4 shows an embodiment to rotate the parity space such that the parity error due to a bias failure on satellite k is entirely along axis 1 of the parity space.

With reference to FIG. 4, through additional orthogonal transformations, an embodiment can rotate the parity space such that the parity error due to a bias failure on satellite k is entirely along axis 1 of the parity space.

$$p^k = Q^k \overline{B} \delta \rho$$
$$= \overline{B}^k \delta \rho$$
$$= \begin{bmatrix} \overline{b}_1^k & \cdots & \overline{b}_k^k & \cdots & \overline{b}_N^k \\ X & \vdots & 0 & \vdots & X \\ \vdots & \vdots & \vdots & \vdots & \vdots \\ X & \vdots & 0 & \vdots & X \end{bmatrix} \begin{bmatrix} 0 \\ \vdots \\ \varepsilon \\ \vdots \\ 0 \end{bmatrix}$$
$$= \begin{bmatrix} (\overline{b}^k)^T \\ X \\ X \\ X \end{bmatrix} \begin{bmatrix} 0 \\ \vdots \\ \varepsilon \\ \vdots \\ 0 \end{bmatrix}$$
$$= \overline{b}_k^k \varepsilon$$

Since the bias only shows up on axis 1, the result is a scalar, and the discriminator, in general, can be determined by the processor 16 using the following:

$$d^k = p_1^k = (\overline{b}^k)^T \delta \rho$$

With no failure, only correlated random errors w are present:

$$d^k = (\overline{b}^k)^T w = (b^k)^T Lw = (b^k)^T \overline{w}$$

where $B^k = Q^k B = \overline{B}^k L^{-1}$, $\overline{w} = Lw$, $E[\overline{w}\overline{w}^T] = I_N$
Note: $\sigma_{d^k}^2 = E[(d^k)^2] = E[(b^k)^T \overline{w}\overline{w}^T b^k] = E[(b^k)^T b^k] = 1$ With a bias failure on satellite k plus the correlated random errors w on each of the satellites, the discriminator can be determined by the processor 16 using the following:

$$d^k = \overline{b}_k^k \varepsilon + (b^k)^T \overline{w}$$

The impact of the noise in addition to failure on the horizontal position is:

$$\delta r^h = S^h \delta \rho = s_k^h \varepsilon + S^h w = s_k^h \varepsilon + \overline{S}^h Lw$$
$$= s_k^h \varepsilon + \overline{S}^h \overline{w}$$

where $S^h$, $\overline{S}^h = 1^{st}$ two rows of $S$ and $\overline{S}$, and $s_k^h$ = column k of $S^h$ Using the Gaussian probability density function, the threshold D, which meets the probability of false alarm, can be determined by the processor 16. At detection, the discriminator magnitude is equal to the threshold:

$$|d^k| = |\overline{b}_k^k \varepsilon + (b^k)^T \overline{w}| = D$$

Assuming the failure is positive and much larger than the noise:

$$|\overline{b}_k^k| \varepsilon + (b^k)^T \overline{w} = D \Rightarrow \varepsilon = \frac{D}{|\overline{b}_k^k|} - \frac{(b^k)^T \overline{w}}{|\overline{b}_k^k|}$$

The resulting horizontal position error can be determined by the processor 16 using the following:

$$\delta r^h = s_k^h \varepsilon + \overline{S}^h \overline{w} = s_k^h \left( \frac{D}{|\overline{b}_k^k|} - \frac{(b^k)^T \overline{w}}{|\overline{b}_k^k|} \right) + \overline{S}^h \overline{w}$$
$$= s_k^h \left( \frac{D}{|\overline{b}_k^k|} - \frac{1}{|\overline{b}_k^k|} \sum_{i=1}^N b_i^k \overline{w}_i \right) + \sum_{i=1}^N \overline{s}_i^h \overline{w}_i$$

The position error magnitude in the direction of the failure is:

$$\delta r_k^h = \frac{s_k^h}{|s_k^h|} \cdot \delta r^h$$
$$= |s_k^h| \left( \frac{D}{|\overline{b}_k^k|} - \frac{1}{|\overline{b}_k^k|} \sum_{i=1}^N b_i^k \overline{w}_i \right) + \sum_{i=1}^N \frac{s_k^h \cdot \overline{s}_i^h}{|s_k^h|} \overline{w}_i$$

$$= \frac{|s_k^h|}{|\overline{b}_k^k|}D + \underbrace{\frac{1}{|\overline{b}_k^k|}\sum_{i=1}^{N}\left(\frac{s_k^h \cdot \overline{s}_i^h}{|s_k^h|}|\overline{b}_k^k| - |s_k^h|b_i^k\right)\overline{w}_i}_{\text{Noise}}$$

Since the random pseudo-range error is uncorrelated with unity variance, the variance of the noise term about the mean can be determined by the processor 16 using the following:

$$\sigma_{\delta r_k^h} = \sqrt{\frac{1}{|\overline{b}_k^k|}\sum_{i=1}^{N}\left(\frac{s_k^h \cdot \overline{s}_i^h}{|s_k^h|}|\overline{b}_k^k| - |s_k^h|b_i^k\right)^2}$$

The Horizontal Protection Level for satellite k can be determined by the processor 16 using the following:

$$HPL_k = \frac{s_k^h}{|s_k^h|}D + K_{md}\sigma_{\delta r_k^h}$$

$$= \frac{s_k^h}{|s_k^h|}K_{fa} + K_{md}\sigma_{\delta r_k^h}$$

where $K_{md}$ and $K_{fa}$ are sigma multipliers set to meet the probabilities of false alarm and missed detection This process is repeated for all N satellites and the total HPL can be determined by the processor 16 using the following:

HPL=max(HPL$_k$), k=1,N

Ionospheric Error Model Calculations

Determination of Ionospheric Grid Points and Pierce Point Coordinates

For a Kalman filter approach, and in order to utilize (17), the processor 16 may first determine the coordinates of each gridpoint and the coordinates of the satellite's ionospheric pierce point. Then, using those two sets of coordinates, the great circle distance between the pierce point and the grid point can be calculated by the processor 16. For either a Kalman filter or snapshot RAIM approach, knowing the coordinates of a point i (e.g., the system illustrated in FIG. 1, or "user") and the distance and azimuth from point i to a point j (e.g. the gridpoint), the coordinates of point j can be determined by the processor 16 as follows:

$$\lambda_j = \tan^{-1}\left(\frac{\sin\lambda_i\cos\psi_{ij} + \cos\lambda_i\sin\psi_{ij}\cos A_{ij}}{\sqrt{(\cos\lambda_i\cos\psi_{ij} - \sin\lambda_i\sin\psi_{ij}\cos A_{ij})^2 + \sin^2\psi_{ij}\sin^2 A_{ij}}}\right) \quad (A.1)$$

$$\Lambda_j = \Lambda_i + \tan^{-1}\left(\frac{\sin\psi_{ij}\sin A_{ij}}{\cos\lambda_i\cos\psi_{ij} - \sin\lambda_i\sin\psi_{ij}\cos A_{ij}}\right) \quad (A.2)$$

$\lambda_i$ = Geodetic latitude of point $i$
$\lambda_j$ = Geodetic latitude of point $j$
$\Lambda_i$ = Geodetic longitude of point $i$
$\Lambda_j$ = Geodetic longitude of point $j$
$A_{ij}$ = Azimuth angle (bearing) from point $i$ to point $j$
$\psi_{ij}$ = Angular distance
 (earth's central angle) from point $i$ to point $j$
$= \frac{d_{ij}}{R_c + h_I}$
$d_{ij}$ = Great circle distance from point $i$ to point $j$
$R_e$ = Radius of the earth = 6378 km
$h_I$ = Height of the ionosphere thin shell model = 350 km The coordinates of the ionospheric pierce point of the satellite can also be calculated using (A.1) and (A.2). In this case, $\psi_{ij}$ represents the central angle from the user location to the pierce point and may be calculated by the processor 16 as follows:

$$\psi_{ij} = \frac{\pi}{2} - E - \sin^{-1}\left(\frac{R_e}{R_e + h_I}\cos E\right) \quad (A.3)$$

where E is the elevation angle of the satellite from the user location with respect to the local tangent plane.

Computing Elevation and Azimuth Angles of Satellite

The elevation angle E of a satellite is defined as the angle the line-of-sight vector makes with the user's local tangent (horizontal) plane. The azimuth angle A of the satellite is the angle of the line-of-sight vector with respect to true north as measured in the horizontal plane. Thus, we have the following $$E = ATAN2\left(-u_{LOS\_z}, \sqrt{u_{LOS\_x}^2 + u_{LOS\_y}^2}\right) \quad (A.4)$$

$$A_0 = ATAN2(u_{LOS\_y}, u_{LOS\_x}) + \alpha \quad (A.5)$$

$$A = \begin{cases} A_0, & -\pi \leq A_0 < \pi \\ A_0 - 2\pi, & A_0 \geq \pi \\ A_0 + 2\pi, & A_0 < \pi \end{cases} \quad (A.6)$$

where $u_{LOS\_x}, u_{LOS\_y}, u_{LOS\_z}$=x, y, and z components of the line-of-sight vector $u_{LOS}^L$ $\alpha$=wander angle (angle in azimuth from north to the x local-level frame axis)

Note that the azimuth angle is adjusted by $\pm 2\pi$ so that the result is between $-\pi$ and $+\pi$.

Determination of Great Circle Distance

The great circle distance along the ionospheric thin shell model from a point i (e.g. satellite pierce point) to another point j (e.g. grid point) may be calculated by the processor 16 as follows:

$$d_{ij} = \qquad (A.7)$$
$$(R_e + h_l)\tan^{-1}\left(\frac{\sqrt{\cos^2\lambda_j\sin^2\Delta\Lambda_{ij} + (\cos\lambda_i\sin\lambda_j - \sin\lambda_i\cos\Delta\Lambda_{ij})^2}}{\cos\lambda_i\cos\lambda_j\cos\Delta\Lambda_{ij} + \sin\lambda_i\sin\lambda_j}\right)$$

where $$\Delta\Lambda_{ij} = \Lambda_j - \Lambda_i$$

Ionospheric Variance Model

The algorithm that may be executed by the processor 16 for calculation of the ionospheric model error variance may be from ICD-GPS-200C and DO-229D J.2.3. Note that the symbols in this section are unique to this section.

Using the satellite's elevation angle E, form the earth's central angle between the user position and the earth projections of ionospheric pierce point $\psi_{pp}$ using equation (A.3).

Next, using the satellite's elevation angle E, the azimuth angle A, the earth's central angle $\psi_{pp}$ and the user geodetic latitude $\lambda_u$ and longitude $\Lambda_u$, determine the pierce point geodetic latitude $\phi_{pp}$ and longitude $\lambda_{pp}$ using equations (A.1) and (A.2).

Form the absolute value of the geomagnetic latitude of the ionospheric pierce point.

$$|\lambda_m| = |\lambda_{pp} + 0.064\pi \cos(\Lambda_{pp} - 1.617\pi)| \text{radians} \qquad (A.8)$$

Form an estimate of the vertical delay error based on geomagnetic latitude $$\tau_{vert} = \begin{cases} 9 \text{ meters}, & |\lambda_m| \le 20 \text{ degrees} \\ 4.5 \text{ meters}, & 22.5° < |\lambda_m| \le 55° \\ 6 \text{ meters}, & |\lambda_m| > 55° \end{cases} \qquad (A.9)$$

Using the elevation angle E, calculate the square of the obliquity factor.

$$F_{pp}^2 = \frac{1}{1 - \left(\frac{R_e\cos(E)}{R_e + h_l}\right)^2} \qquad (A.10)$$

Form the modeled estimated variance of the ionospheric delay.

$$\sigma_{model}^2 = F_{pp}^2 \tau_{vert}^2 \qquad (A.11)$$

Form the estimated variance using the compensation that is applied if available from the receiver. (If not, assume zero).

$$\sigma_{comp}^2 = \left(\frac{CT_{IONO}}{5}\right)^2 \qquad (A.12)$$

Form the estimated variance of the ionospheric delay.

$$\sigma_{iono}^2 = \max(\sigma_{model}^2, \sigma_{comp}^2) \qquad (A.13)$$

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A navigation system for a vehicle having a receiver operable to receive a plurality of signals from a plurality of transmitters, the navigation system comprising:
   a processor; and
   a memory device having stored thereon machine-readable instructions that, when executed by the processor, enable the processor to:
   determine a set of error estimates corresponding to pseudo-range measurements derived from the plurality of signals,
   determine an error covariance matrix for a main navigation solution based on the determined set of error estimates, the error covariance matrix including off-diagonal elements representing ionospheric-delay spatial correlation, and
   using a parity space technique, determine at least one protection level value based on the error covariance matrix.

2. The system of claim 1 wherein determining the error covariance matrix includes determining a spatially correlated ionospheric error associated with each of the transmitters.

3. The system of claim 2 wherein determining the error covariance matrix includes defining a plurality of grid points on a thin shell model of the ionosphere.

4. The system of claim 3 wherein the defined grid points are equally spaced in azimuth at a great circle distance from the system.

5. The system of claim 4 wherein the great circle distance is 1500 km.

6. The system of claim 3 wherein determining the error covariance matrix includes defining a vector of normalized ionospheric delays at the grid points.

7. The system of claim 1 wherein the at least one protection level value comprises a horizontal protection level value.

8. The system of claim 1 wherein the at least one protection level value comprises a vertical protection level value.

9. The system of claim 1 wherein the at least one protection level value comprises a horizontal exclusion level value.

10. A non-transitory computer-readable medium having computer-executable instructions for performing steps comprising:
    determining a set of error estimates corresponding to pseudo-range measurements derived from the plurality of signals;
    determining an error covariance matrix for a main navigation solution using ionospheric-delay data, wherein the error covariance matrix includes off-diagonal elements representing the spatially correlated ionospheric error for the plurality of signals;
    using a parity space technique, determining at least one protection level value based on the error covariance matrix; and
    displaying the at least one protection level value.

11. The medium of claim 10 wherein determining the error covariance matrix includes determining a spatially correlated ionospheric error associated with each of the transmitters.

12. The medium of claim 11 wherein determining the error covariance matrix includes defining a plurality of grid points on a thin shell model of the ionosphere.

13. The medium of claim 12 wherein the defined grid points are equally spaced in azimuth at a great circle distance from the system.

14. The medium of claim 13 wherein the great circle distance is 1500 km.

15. The medium of claim 12 wherein determining the error covariance matrix includes defining a vector of normalized ionospheric delays at the grid points.

16. The medium of claim 10 wherein the at least one protection level value comprises a horizontal protection level value.

17. The medium of claim 10 wherein the at least one protection level value comprises a vertical protection level value.

18. The medium of claim 10 wherein the at least one protection level value comprises a horizontal exclusion level value.

19. A method, comprising the steps of:

accessing from a first computer the computer-executable instructions of claim 10; and providing the instructions to a second computer over a non transitory communications medium.

* * * * *